United States Patent [19]

Takeuchi et al.

[11] Patent Number: 4,742,505
[45] Date of Patent: May 3, 1988

[54] OPTICAL INFORMATION RECORDING AND REPRODUCING MEMORY SYSTEM

[75] Inventors: Toyoaki Takeuchi, Ina; Yoshiaki Ikeda, Hachioji; Hideyuki Kenjyo, Koganei, all of Japan

[73] Assignee: Olympus Optical Company Limited, Tokyo, Japan

[21] Appl. No.: 799,811

[22] Filed: Nov. 20, 1985

[30] Foreign Application Priority Data

Nov. 21, 1984 [JP] Japan .................. 59-246904

[51] Int. Cl.$^4$ .................................... G11B 7/00
[52] U.S. Cl. ........................... 369/45; 369/106; 369/120; 369/121; 369/116
[58] Field of Search ................... 369/44–46, 369/106, 111, 120–122, 116; 372/26

[56] References Cited

U.S. PATENT DOCUMENTS

| | | | |
|---|---|---|---|
| 3,996,526 | 12/1976 | d'Auria et al. | 372/26 X |
| 4,241,423 | 12/1980 | Burke et al. | 369/120 X |
| 4,516,242 | 5/1985 | Yokota | 372/26 X |
| 4,520,469 | 5/1985 | Todokoro et al. | 369/44 |
| 4,585,933 | 4/1986 | Ando | 369/120 X |

FOREIGN PATENT DOCUMENTS 55-22290 2/1980 Japan .................. 369/106
55-122240 9/1980 Japan .................. 369/106

OTHER PUBLICATIONS

Karr et al; "Output Power Stability of GaAlAs Laser Transmitters using an Optical Tap for Feedback Control"; Applied Optics, vol. 18, No. 8, Apr. 79.

K. D. Broadbent, Journal of the Society of Motion Picture and Television Engineers, vol. 83, No. 7, Jul. 1974, pp. 553–559.

Primary Examiner—Aristotelis M. Psitos
Attorney, Agent, or Firm—Bruce L. Adams; Van C. Wilks

[57] ABSTRACT

An optical information recording and reproducing system comprises a light source for emitting a working beam from a front end thereof and a monitoring beam from a rear end thereof, an optical system control circuit, a loop gain adjusting circuit and a photo detector. The monitoring beam emitted from the rear end of the light source is detected by the photo detector, and the loop gain of the servo loop control circuit for the focusing and/or tracking is automatically adjusted by means of the loop gain adjusting circuit according to the detected signal so that a desired closed loop control of the working beam can be performed according to the operation modes and the light beam power variation.

19 Claims, 2 Drawing Sheets

OPTICAL INFORMATION RECORDING AND REPRODUCING MEMORY SYSTEM

BACKGROUND OF THE INVENTION

The present invention relates generally to an optical information recording and reproducing memory system which records, reproduces or erases information data by means of the irradiation of a light beam onto a data storing medium.

More specifically, the present invention relates to the memory system wherein the light beam is focus controlled or tracking-controlled relative to the appropriate position of the data storing medium.

It is well known to effect information storing, reproducing or erasing onto an optical data storing medium such as a metal film, thermoplastics or magneto-optical magnetic film by means of an optical information recording and reproducing memory system.

In the above memory system, information data is optically or magneto-optically stored on or erased from the optical data storing medium by the formation of pits or by the phase transmuting of the film.

Therefore, when the memory system is operated in the data writing or erasing mode, a light source e.g. laser diode emits a high powered light beam so that the pit formation or phase transmuting can be performed on the data storing medium.

On the other hand, when the memory system is operated in the data reproducing mode (read-out mode), the light source emits a weakened light beam so that any destruction of the previously stored data can not occur on the data storing medium.

As above described, in the optical information recording and reproducing memory system, the light beam emitted from the light source is charged in its power (in other words intensity) depending on the operational modes.

Furthermore, the light beam is, in general, focus controlled and/or tracking-controlled so that the precisely positioned light spot can be directed to the data storing medium. The light spot is generally focused into about 1 micron meter or less in its diameter by means of the focusing control.

The light beam control of the focusing and/or tracking is performed by means of the control system which comprises a control circuit and an optical system with an objective lens, a mirror and other optical components of an optical pickup.

The control system is fundamentally a servo loop control system. The light beam from the light source is transmitted or reflected by the data storing medium, and the light is detected by a dual- or quadruple-photo detector. The detector supplies a servo error signal to the control circuit. The control circuit drives the optical system depending on the servo error signal and the light beam is controlled to effect focusing and/or tracking in a closed loop manner.

To put it more concretely, the focusing control of the light beam is performed by the shift of the moving objective lens or the optical pickup which is driven by the control circuit depending on the focus error signal as a servo error signal. Also the tracking control of the light beam is performed by the shift of the objective lens position, or the change of the inclination of the mirror, or the shift of the optical pickup position by means of a voice coil motor which is driven by the control circuit depending on the tracking error signal as a servo error signal.

However, as previously described, the light source emits the high powered light beam and the weakened low powered light beam in the write mode and the read-out mode, respectively. Therefore, in the prior art, once the loop gain of the control system is adjusted to the write mode, the control system has to work in the poor control gain when the memory system is operated in the read-out mode. On the other hand, once the loop gain of the control system is adjusted to the read-out mode, the control system has to work in the excessive control gain when the memory system is operated in the write mode.

Thus the memory system in the prior art has a shortcoming of unstable control in the light beam focusing or tracking.

To overcome the above drawback, there is proposed an improved optical memory system in which the loop gain of the control system is changed by means of a change-over switch together with the change of the power of the light beam (Japanese Patent Application Laid-open No. 84-22290).

According to the prior art, the loop gain of the control system is changed by means of the switch depending on the operation mode of the memory system e.g. write mode or read-out mode.

However, the control system can not maintain the suitably controlled condition when there is a drop in the power of the light beam due to the degradation of the light source or others. Thus, there is still left the short coming of the poverty of the stable control in the light beam focusing and/or tracking in the memory system.

Besides the prior art above described, there is another prior art for the compensation of the drop in the power of light beam due to the degradation of the light source so as to maintain the suitably controlled condition of the control system.

In the above system, a part of the light beam emitted from the light source is splitted by an optical means e.g. beam splitter which is located in the light pass between the light source and the data storing medium. The intensity of the split light beam is detected by means of an especially located photo detector e.g. silicon photo-cell. Thus the control system can be operated to maintain the suitably controlled condition according to the signal detected by the photo detector (Journal of the SMPTE, vol. 83, pp. 557, 1975).

According to the prior art as above described, however, not only the beam splitter and other components are especially required for the system but also a part of the light beam is split away from the emitted light flux from the light source by means of the beam splitter. Thus the light beam which is originally used for the irradiation onto the data storing medium is partially used for the detecting of the light power. Furthermore it is difficult to shoot the cause of the trouble due to the degradation of the light source or the matter with the optical means.

SUMMARY OF THE INVENTION

It is an object of the present invention to obviate the above described shortcomings and to provide an improved optical information recording and reproducing memory system, which can control the light beam to effect focusing and/or tracking corresponding directly to the variation of the light power from the light source.

Therefore, according to the present invention, there is provided an optical information recording and reproducing memory system comprising a light source, optical system control means which is composed of at least one control loop for light beam tracking or focusing relative to the data storing medium, loop gain adjusting means which adjusts loop gain of the control loop of the optical system control means, and photo detecting means which detects at least a part of emitted light flux from the light source and supplies the loop gain adjusting means with a detected monitor signal.

According to the invention, the light beam emitted from the light source is directly detected by the photo detector and the loop gain of the control means for the light beam can be automatically adjusted by the detected signal so that the focusing control and/or the tracking control of the light beam can be performed in the suitable condition depending on the operation modes and the light power without the effects of the light source degradation.

Hence, according to the present invention, the highly stable and reliable optical information recording and reproducing memory system can be provided.

Furthermore, according to the present invention, the power of the emitted light beam from the light source is directly detected by the photo detector which detects the light flux from the rear-end of the laser diode of the light source. Therefore, there is no waste in the light beam which is directed to the data storing medium whereas there is a loss in the prior art as above described. In addition, the laser diode and photo detector integrated in a single device can be easily produced and makes the assembly of the memory system easy and convenient. Furthermore, when there is a deviation in the detected signal, speedy trouble shooting of the laser diode can be available because of direct detection of the light flux from the rear-end of the laser diode.

BRIEF DESCRIPTION OF THE DRAWINGS

The invention will now be described with reference to the accompanying drawings, in which.

DESCRIPTION OF THE PREFERRED EMBODIMENT

Figure 1:
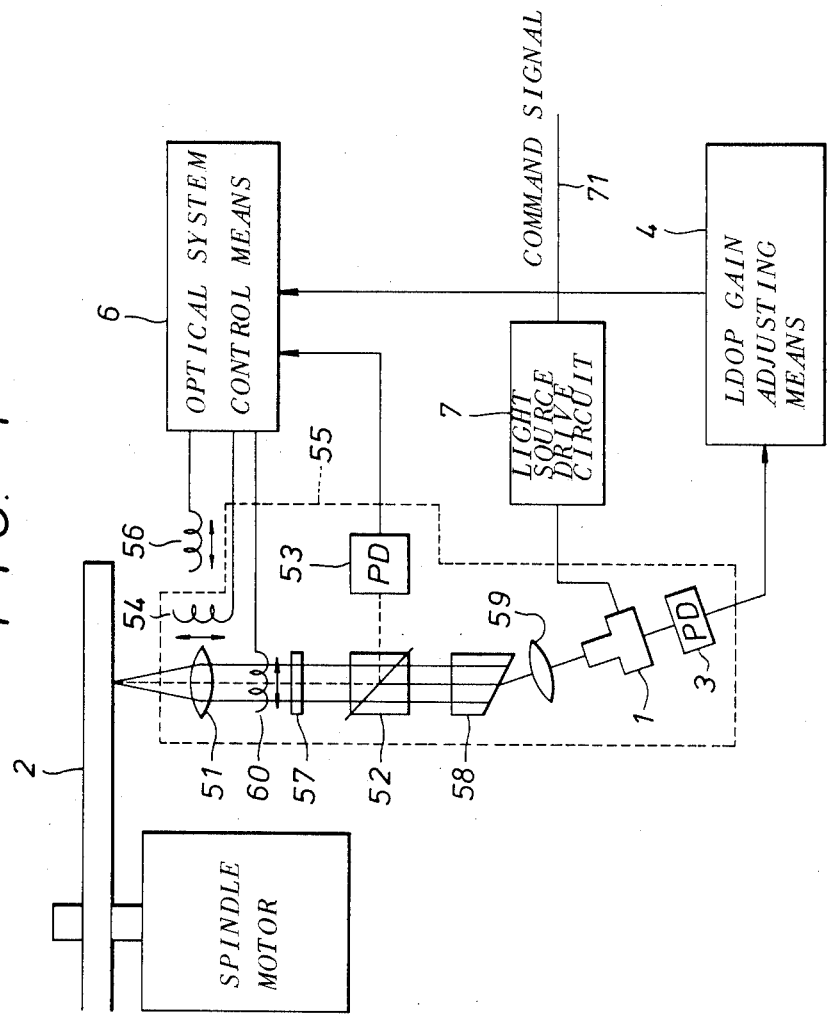
FIG. 1 is a diagram of an optical information recording and reproducing memory system according to the present invention.

As previously noted, the present invention relates to an improved optical information recording and reproducing memory system.

Referring now to the drawings, wherein the same reference numerals in the different illustrations identify identical parts, the preferred embodiment of the invention will be described.

FIG. 1 of the drawings is a diagrammatic illustration of the preferred embodiment of the invention. A laser diode 1 as a light source irradiates a working light beam onto a data storing medium 2. At the same time, the laser diode 3 emits a light flux or monitoring beam from the rear-end thereof which is detected by a p-i-n photo diode as a photo detector 3. The photo detector 3 produces the detected electric signal or monitor signal representative of intensity of the working beams and supplies a loop gain adjusting means 4 with the detected electric signal. A moving objective lens 51 focuses the working light beam which is emitted from the laser diode 1 onto the data storing medium 2 via a colimator lens 59, a shaping plism 58, a polarizing plism (or help mirror) 52 and a λ/4 plate 57 of an optical pickup 55. Reflected light beam from the data storing medium 2 is detected by a dual- or quadruple-photo detector 53 via the moving objective lens 51, λ/4 plate 57 and polarizing plism (or half mirror) 52.

The detector 53 produces an electric signal or error signal representative of positional deviation of the optical pick-up 55 relative to the data storing medium 2 and supplies optical system control means 6 with the error signal. Also, the loop gain adjusting means 4 supplies the optical system control means 6 with an output signal. The optical system control means 6 supplies drive signals to a coil 54 which moves the lens 51 vertically relative to the medium 2 for the focusing control, a coil 60 which moves the lens 51 horizontally relative to the medium 2 for the tracking control, and/or a voice coil motor 56 which moves the optical pickup 55 for the tracking control. A light source drive circuit 7 supplies the light source 1 with a drive signal in response to a command signal 71.

According to the embodiment, the light source drive circuit 7 drives the laser diode 1, and the diode 1 emits a modulated high powered laser beam of large intensity when the circuit 7 is controlled by the command signal 71 a write mode which commands or mode of the operation. When the light source drive circuit 7 is supplied with the command signal 71 which commands a read-out mode of the operation, the laser diode 1 emits a lower powered laser beam of small intensity. The laser beam, which is focus-controlled and/or tracking controlled by means of the lens 51 or the voice coil motor 56, is irradiated onto the appropriate position of the data storing medium 2 and the information recording, erasing or reproducing is performed.

Meanwhile, the reflected light from the data storing medium 2 is converted into the focus error signal or tracking error signal by means of the photo detector 53, and these servo error signals are supplied to the optical system control means 6. The optical system control means 6 comprised of a differential amplifier and other electric means provides the coils 54, 60 and/or voice coil motor 56 with the drive signal corrected according to the servo error signal so that the pick-up 55 is correctively driven and the working light beam can be properly controlled. Thus the working light beam emitted from the laser diode 1 is controlled with the closed servo loop.

On the other hand, the photo detector 3 which detects a part of the light flux or monitoring beam from the rear-end of the laser diode 1 supplies the loop gain adjusting means 4 with the detected or monitor signal. And the loop gain of the closed servo loop is properly adjusted by means of the optical system control means 6 according to the supplied output signal from the loop gain adjusting means 4.

Therefore, the focus control and/or the tracking control of the laser beam is properly performed by the suitable loop gain of the closed servo loop depending on the each operation mode of the memory system.

Figure 2:
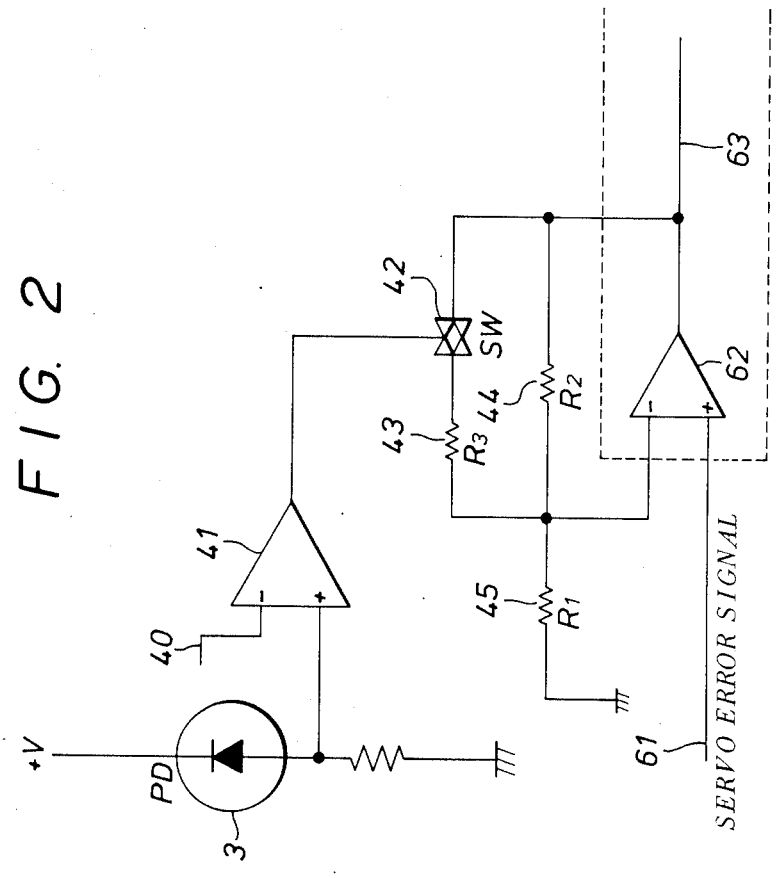
FIG. 2 is a circuit diagram for the control loop gain adjusting means of a preferred embodiment of the invention.

FIG. 2 is a circuit diagram for the control loop gain adjusting means 4 of the preferred embodiment of the invention. The photo detector 3 supplies a differential amplifier 41 with the detected signal corresponding to the light flux from the rear-end of the laser diode 1 (not shown in FIG. 2). The differential amplifier 41 is also supplied with a reference signal 40 on the inverting input and supplies a switch 42 with the compared output signal of the differential amplifier 41 representative of intensity of the working beam.

On the other hand, the servo error signal 61 i.e. focus error signal or tracking error signal, which is produced by means of the dual- or quadruple-photo detector 53 (not shown in FIG. 2), is supplied to a differential amplifier 62 of the optical system control means 6. A resistor (R$_3$) 43 and a series connected switch 42, and a resistor (R$_2$) 44 connected in parallel, to the resistor 43 and switch 42 are connected to the the differential amplifier 62 in parallel and form a feed back resistor circuit. A resistor (R$_1$) 45 is an input resistor of the differential amplifier 62. The output signal 63 of the differential amplifier 62 is provided to a drive circuit of the optical system control means 6 (not shown in FIG. 2).

According to the embodiment shown in FIG. 2, the servo loop gain of the control system is adjusted to the suitable value in the following manner.

In the write mode erase mode, the laser diode 1 emits the high powered laser beam and the photo diode 3 supplies the differential amplifier 41 with the higher output signal than the reference signal 40. Therefore, high-leveled ("H" level) output signal is produced from the differential amplifier 41 and makes the switch 42 close (ON). Then the amplifying gain (G) of the differential amplifier 62 is lowered because of the parallel connection of the feed back resistors R$_2$ and R$_3$. The gain G is determined by the following relation:

$$G=1+[(R_2+R_3)/R_1 \cdot R_2 \cdot R_3]$$

In the read-out mode, the laser diode 1 emits the lower power laser beam and the photo diode 3 supplies the differential amplifier 41 with the lower output signal than the reference signal 40.

Therefore, the low level ("L" level) output signal is produced from the differential amplifier 41 and makes the switch 42 open (OFF). Then the amplifying gain (G) of the differential amplifier 62 is increased to a high value because of the connection of the single resistor R$_2$. The gain G is determined by the following relation:

$$G=1+(R_2/R_1)$$

According to the embodiment as above described, the control loop gain (G) of the suitable value according to the write mode or read-out mode of the operation of the optical memory system.

Besides the above described embodiment in which the gain adjustment is performed by the selection of the feed back resistor of the differential amplifier, another analog gain adjusting means which adjusts the gain continuously depending on the output signal of the photo detector can be easily applied. In this analog controlled case, contenuous gain adjustment depending on the degradation of the laser diode due to the life or the ambient temperature rise can be also performed.

Furthermore, the present invention of the optical memory system is not restricted to the control system of the focusing or tracking control of the light beam. This invention can be also applied to the control system of the jitters.

While the embodiments of the present invention have been described in substantial detail, it will be apparent that the invention may take many forms. Accordingly, it should be understood from the above description that variouis changes and modifications in the form and detail may be made therein without departing from the spirit and scope of the invention.

What is claimed is:

1. An optical information recording and reproducing memory system having means for recording, reproducing or erasing data information by means of an irradiation of a light beam onto a data storing medium, comprising:

a light source for emitting a light beam from a front end thereof and a light flux from a rear end thereof;

optical system control means including at least one control loop for controlling the light beam emitted from said light source and irradiating the emitted light beam onto a data storing medium;

loop gain adjusting means for adjusting the loop gain of said control loop of said optical system control means according to the power of said light beam; and photo detecting means for detecting the light flux emitted from the rear end of said light source and supplying said loop gain adjusting means with a detected monitor signal.

2. A system according to claim 1; wherein said control loop includes means for controlling tracking of the light beam, comprising an optical pickup having a movable objective lens for moving the light beam, and a voice coil motor for moving the optical pickup.

3. A system according to claim 1; wherein said control loop includes means for controlling focusing of the light beam, comprising a focusing objective lens for focusing said light beam onto the data storing medium.

4. A system according to claim 1; wherein said control loop comprises a movable objective lens for controlling both the focusing and tracking of the light beam relative to said data storing medium.

5. A system according to claim 1; wherein said loop gain adjusting means comprises an operational amplifier for receiving at a non-inverting input terminal thereof a servo error signal fed from the optical system control means, a feed back resistor connected between an output terminal of said operational amplifier and an inverting input terminal of said operational amplifier, a differential amplifier supplied with a reference signal and an output signal of said photo detecting means, a switch supplied with a compared output signal from the differential amplifier, a resistor series-connected to said switch and connected in parallel to said feed back resistor, and an input resistor for connecting said inverting input terminal of said operational amplifier to the ground.

6. A system according to claim 1; wherein said photo detecting means comprises a p-i-n photo diode for detecting the light flux emitted from the rear end of said light source.

7. A system according to claim 1; wherein said photo detecting means and said light source comprise a p-i-n photo diode and a laser diode which are mounted in a single body.

8. An optical information recording and reproducing apparatus comprising: radiation emitting means for emitting optical radiation composed of a working beam emitted from a front end of the radiation emitting means and a monitoring beam emitted from a rear end of the radiation emitting means; optical pick-up means receptive of the working beam and driven by a drive signal to undergo movement relative to a data storing medium for sweeping the working beam across the data storing medium to thereby enable information to be optically recorded on and reproduced from the data storing medium; first detecting means for detecting the working beam reflected by the data storing medium during the sweep of the working beam to produce an error signal representative of positional deviation of the optical pick-up means relative to the data storing medium during the movement thereof; control means for carrying out a servo operation such that the control means applies a drive signal corrected according to the error signal to the optical pick-up means so as to compensate for the positional deviation thereof during the movement thereof; second detecting means for detecting the monitoring beam to produce a corresponding monitor signal representative of the intensity of the working beam; and regulating means connected between the second detecting means and the control means for regulating the servo operation of the control means according to the monitor signal.

9. An apparatus according to claim 8; wherein the control means includes amplifying means for amplifying the error signal with a variable gain to produce the corrected drive signal; and the regulating means includes adjusting means for adjusting the variable gain of the amplifying means according to the monitor signal so as to regulate the servo operation of the control means.

10. An apparatus according to claim 8; wherein the radiation emitting means includes a laser diode for emitting the working beam from a front end thereof and emitting the monitoring beam from a rear end thereof.

11. An apparatus according to claim 10; wherein the second detecting means comprises a photo diode mounted on the rear end of the laser diode.

12. An apparatus according to claim 8; wherein the optical pick-up means includes an objective lens movable horizontally relative to the data storing medium to effect tracking of the working beam; and the first detecting means includes means for producing a tracking error signal representative of the horizontal deviation of the optical pick-up means relative to the data storing medium.

13. An apparatus according to claim 8; wherein the optical pick-up means includes an objective lens movable vertically relative to the data storing medium to effect focusing of the working beam; and the first detecting means includes means for producing a focusing error signal representative of the vertical deviation of the optical pick-up means relative to the data storing medium.

14. An apparatus according to claim 9; wherein the radiation emitting means includes means operative when information is recorded on the data storing medium for emitting a writing beam of relatively large intensity effective to record the information and operative when information is reproduced from the data storing medium for emitting a reading beam of relatively small intensity effective to reproduce the information.

15. An apparatus according to claim 14; wherein the adjusting means includes means for setting a relatively small gain of the amplifying means during the emission of the writing beam and for setting a relatively large gain of the amplifying means during the emission of the reading beam.

16. An apparatus according to claim 14; wherein the radiation emitting means further includes means operative when information is erased from the data storing medium for emitting an erasing beam of relatively large intensity effective to erase the recorded information.

17. An apparatus according to claim 16; wherein the adjusting means includes means for setting a relatively small gain of the amplifying means during the emission of the erasing beam.

18. An apparatus according to claim 9; wherein the amplifying means comprises an operational amplifier.

19. An apparatus according to claim 18; wherein the adjusting means comprises a differential amplifier for differentially amplifying the monitor signal, a variable feed back resistor connector in parallel with the operational amplifier for determining the gain thereof, and means for selecting the resistance value of the variable feed back resistor according to the differentially amplified monitor signal.

* * * * *